Figure 1:
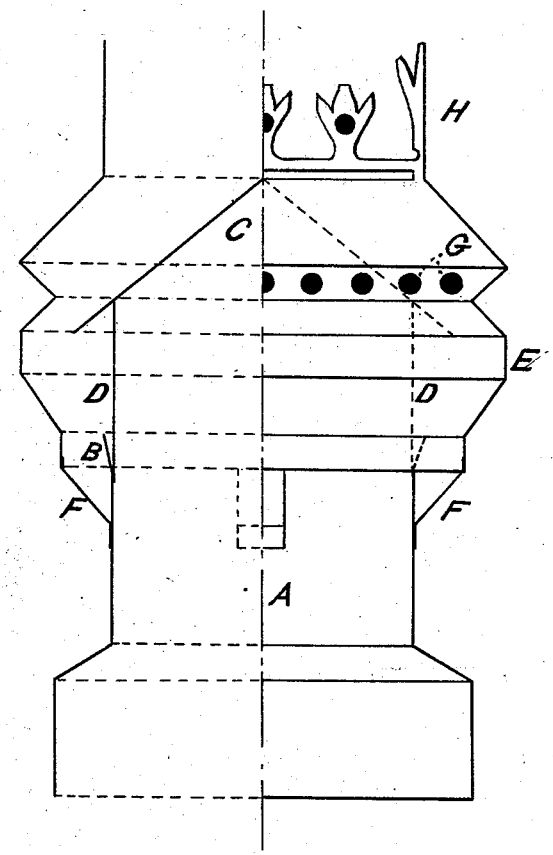

G. W. & L. DEMOND.
Chimney Top and Ventilator.

No. 224,154.    Patented Feb. 3, 1880.

WITNESSES.
Geo. W. Clark
Isaac N. Leonard

INVENTORS
George W. Demond
Louis Demond
Per G. Stackpole
Atty

UNITED STATES PATENT OFFICE.

GEORGE W. DEMOND AND LOUIS DEMOND, OF BROOKLYN, N. Y.

CHIMNEY-TOP AND VENTILATOR.

SPECIFICATION forming part of Letters Patent No. 224,154, dated February 3, 1880.

Application filed February 11, 1879.

*To all whom it may concern:*

Be it known that we, GEORGE W. DEMOND and LOUIS DEMOND, both of the city of Brooklyn, in the county of Kings and State of New York, have jointly invented certain new and useful Improvements in Chimney-Tops and Ventilators, which improvements are fully set forth in the following specification and accompanying drawing, in which—

Figure 1 is a combined vertical section and side elevation of our improved chimney-top and ventilator. The dotted lines represent the vertical section.

A is the body or shaft, the top B of which is turned outward to sheer the wind to the outside of the conical top C. Said conical top C is attached to the shaft A by braces D. A guard or outer casing, E, is attached to the shaft A by braces F, its lower end extending below the outward curved top B of the shaft A, and its upper end extending above the conical top C. The outer casing is made large, so as to leave a considerable space between its inner sides and the conical top C, and its outer sides are constructed with an angular or V groove running horizontally around it, the upper angle of said groove being somewhat longer than the lower one, so as to project beyond it, and is provided with holes or openings G, so that the wind striking the lower angle is turned upward and through the openings G, thereby causing a powerful upward current. The conical top C, which is attached to the shaft A, is for the purpose of preventing the rain or snow passing to the inside of the shaft, and the outward-turned top B of the shaft is to sheer the wind and prevent its getting under the conical top. The top of the outward casing is surmounted with an ornamental railing, giving to it a very beautiful appearance.

The object of our invention is to provide a chimney-top and ventilator for improving the draft in chimneys and for ventilating buildings, so that the wind blowing in any direction will create a powerful upward current, and that shall be so constructed as to harmonize more completely with certain kinds of architecture, its appearance being made to correspond with such architecture.

Having thus described our invention, what we claim as new, and desire to secure by Letters Patent, is—

The outside casing E, provided with the openings G, and attached to the shaft A by the braces F and D, the latter supporting the cap C, substantially as and for the purpose set forth.

GEORGE W. DEMOND.
LOUIS DEMOND.

Witnesses:
RUFUS CHANDLER,
AUGUSTUS HURD.